United States Patent

Geiger

[11] Patent Number: 5,503,270
[45] Date of Patent: Apr. 2, 1996

[54] STACK-HOLDING MEMBER WITH ALIGNED STACKED RINGS

[75] Inventor: Hans-Peter Geiger, Korntal-Münchingen, Germany

[73] Assignee: Hugo Benzing KG, Korntal-Munchingen, Germany

[21] Appl. No.: 244,885

[22] PCT Filed: Mar. 16, 1993

[86] PCT No.: PCT/EP93/00612

§ 371 Date: Jun. 10, 1994

§ 102(e) Date: Jun. 10, 1994

[87] PCT Pub. No.: WO93/18985

PCT Pub. Date: Sep. 30, 1993

[30] Foreign Application Priority Data

Mar. 18, 1992 [DE] Germany ............ 42 08 589.6

[51] Int. Cl.⁶ .................................................. B65D 85/02
[52] U.S. Cl. ............................................. 206/303; 206/493
[58] Field of Search ...................................... 206/303, 445

[56] References Cited

U.S. PATENT DOCUMENTS

| | | | |
|---|---|---|---|
| 2,607,140 | 8/1952 | Taylor | 206/303 |
| 2,737,292 | 3/1956 | Neff | 206/303 |
| 2,949,184 | 8/1960 | Lehner et al. | 206/493 |
| 3,279,591 | 10/1966 | Steinbock | 206/303 |
| 4,050,578 | 9/1977 | Eckert | 206/493 |
| 4,300,684 | 11/1981 | Smith et al. | 206/493 |

FOREIGN PATENT DOCUMENTS

| | | | |
|---|---|---|---|
| 1265078 | 3/1968 | Germany | 206/303 |
| 7234344 | 2/1973 | Germany | 206/303 |
| 0821955 | 10/1959 | United Kingdom | 206/303 |
| 0943152 | 11/1963 | United Kingdom | 206/303 |

*Primary Examiner*—Jimmy G. Foster
*Attorney, Agent, or Firm*—Jansson & Shupe, Ltd.

[57] ABSTRACT

The invention relates to a stack-holding member with ring or disk shaped parts having a radial opening, such as lock rings and the like, which are arranged on a stack-holding member inserted in the inner space of the stack of rings, the stack-holding member supporting the rings, with play, and orienting the rings in the same direction so that the rings may be easily removed from or added to the stack.

14 Claims, 2 Drawing Sheets

STACK-HOLDING MEMBER WITH ALIGNED STACKED RINGS

FIELD OF THE INVENTION

This invention is related generally to part-holding devices and, more particularly, to devices for stacking ring or disk shaped parts.

BACKGROUND OF THE INVENTION

Certain manufacturing processes utilize lock rings or similar components which are shaped in a ring or disk configuration and have a radial slot (or "opening"). Efficient manufacturing requires that the rings be organized in such a way that they may be simply and easily incorporated into the production process. The rings must also be organized so that the supply of rings may be quickly and rapidly replenished as the manufacturing process progresses.

Several devices of the prior art have sought to solve these problems but have met with only limited success. Two examples are GB-PS 821 955 and DE-GM 72 34 344. In these known stack-holding devices, the stack-holding member is held in the inner space of the arranged parts in a non-adjustable and non-rotatable manner. If the inner space of the parts has a ring shaped contour that is not stepped, a supporting element is used which rests flush against the contour of the inner space. This requires a substantial supporting element and therefore also a substantial stack-holding member which is usually designed in the form of a corresponding profile section and is manufactured accordingly. This embodiment of the stack-holding member could be economical for parts of small dimensions, but such an embodiment of the stack-holding member is not economical for large, heavy parts since, on the one hand, it is very expensive and, on the other hand, the weight is greatly increased. This latter disadvantage can be avoided to some extent by using a hollow profile section, as is additionally disclosed by GB-PS 821 955.

U.S. Pat. No. 2,985,295 illustrates an arrangement wherein the parts are embedded or shrunk in a foil, whereby the orientation of the parts must be done on an auxiliary rail prior to the shrinking or embedding process. The stack thus formed is placed on a guiderail of a removal device and, following the removal of the foil, the separation of the parts can begin. The alignment of the parts in this arrangement, however, is done by the foil. This very foil is currently the source of problems, due to environmental considerations, expense and inconvinience of removing the foil. The removal of the foil and its disposal increases the cost of unstacking the parts. In addition, these problems are aggravated in stacks that contain large parts.

A simple, inexpensive device capable of stacking a plurality of ring-shaped parts so that the parts may be easily manipulated and replenished would represent a significant improvement.

OBJECTS OF THE INVENTION

It is an object of this invention to provide an improved device for stacking ring or disk shaped parts having a radial slot thus overcoming some of the problems and shortcomings of devices of the prior art.

Another object of this invention is to provide a device which organizes and supports a plurality of ring or disk shaped parts each having a radial slot.

It is also an object of the invention that the device organize and support the ring or disk shaped parts so that they are oriented in a single direction.

A further object of this invention is to provide a device which organizes, supports and orients the parts so that they may be easily and efficiently transferred from the device.

It is also an object of this invention that parts may be easily and efficiently placed onto the stack-holding device.

Yet another object of this invention is to provide a stack-holding device which may be reused.

An additional object is to provide a stack-holding device to which parts may be secured thus preventing loss of such parts.

A further object of this invention is to provide a packaging device which is simple to manufacture, sturdy and lightweight.

These and other important objects will be apparent from the following descriptions and from the drawings.

SUMMARY OF THE INVENTION

The task of the invention is to devise a stack-holding device of the initially indicated type which uses a stack-holding member that is easy and inexpensive to manufacture and which can be reused, thus preventing environmental problems. In addition to that, the parts should be properly oriented, but for reasons of production and further processing, they should be adjustable to a limited degree.

This task is accomplished according to the invention in that the orienting element and the supporting element are designed as a bent sheet metal part, whereby the supporting element rests, with play, on the inner contour of the parts (e.g., ring inner edges) with the two supporting edges that are with the radial slots, so that the orienting element is retained in the radial slots in an adjustably limited manner.

More specifically, the invention is a stack-holding member for aligned stacked rings, each ring being of the type having an inner edge defining an inner space and a radial opening formed between opposed ring ends. The stack-holding member includes a pair of sidewalls converging to form a angled (preferably V-shaped) ring-orientation portion for supporting the ring ends. The sidewalls extend to distal edges remote from the ring-orientation portion, such distal edges being spaced apart at positions for engagement with the inner edges of the rings. A plurality of rings is supported on the stack-holding member with the angled ring-orientation portion extending through the radial openings of such rings, and the distal edges serving to keep the rings from moving into misalignment by excessive rotation in either direction. With this configuration of the stack-holding member, the rings are supported with play in self-alignment on the stack-holding member.

In highly preferred embodiments, the stack-holding member is made of bent sheet metal. There preferably are bearing elements at one end of the stack-holding member, each extending from one of the sidewalls in position for contact with an end ring of the plurality of rings. The stack-holding member and bearing elements are preferably together formed of a single piece of bent sheet metal.

It is most preferred that the sidewalls and the distal edges of such sidewalls be symmetrical to one another. The distal edges are most preferably positioned along the inner edges of the rings in the area of the ring diameter which is perpendicular to the radial opening.

Certain preferred embodiments include securement means on the sidewalls for preventing removal of rings from the stack-holding member, so that they cannot be lost. Such securement means preferably include a pair of aligned openings which receive a locking member extending between and through the sidewalls in position to interfere with ring movement along the stack-holding member. Preferred embodiments include plug elements extending from one end of the stack-holding member, such plug elements being configured for engagement with related equipment to which the rings are fed one by one.

A bent sheet metal stack-holding member provides sufficient sturdiness to support even heavy ring-shaped parts, and is used in the production process of parts as a support, whereby, in particular after the stamping or rolling process during surface treatment, it carries loose parts. In this case the advantage is that the packaging element rests only on the supporting edges, despite the ring shaped inner space, therefore leaving the major portion of the inner contour of the parts empty.

During the unstacking process the parts can easily be removed from the stack-holding member. The stack-holding member can be returned to the manufacturer of the parts. Today this is easily accomplished, since deliveries already come in specified containers which travel from the manufacturer to the user, and back again.

The packaging element is robust and simple and can also be used in the factory in the course of production and treatment in hot liquids, such as during phosphating.

BRIEF DESCRIPTION OF THE DRAWINGS

The invention is described in more detail by means of exemplified embodiments illustrated in the drawings. Shown are.

DETAILED DESCRIPTION OF THE PREFERRED EMBODIMENTS

Figure 1:
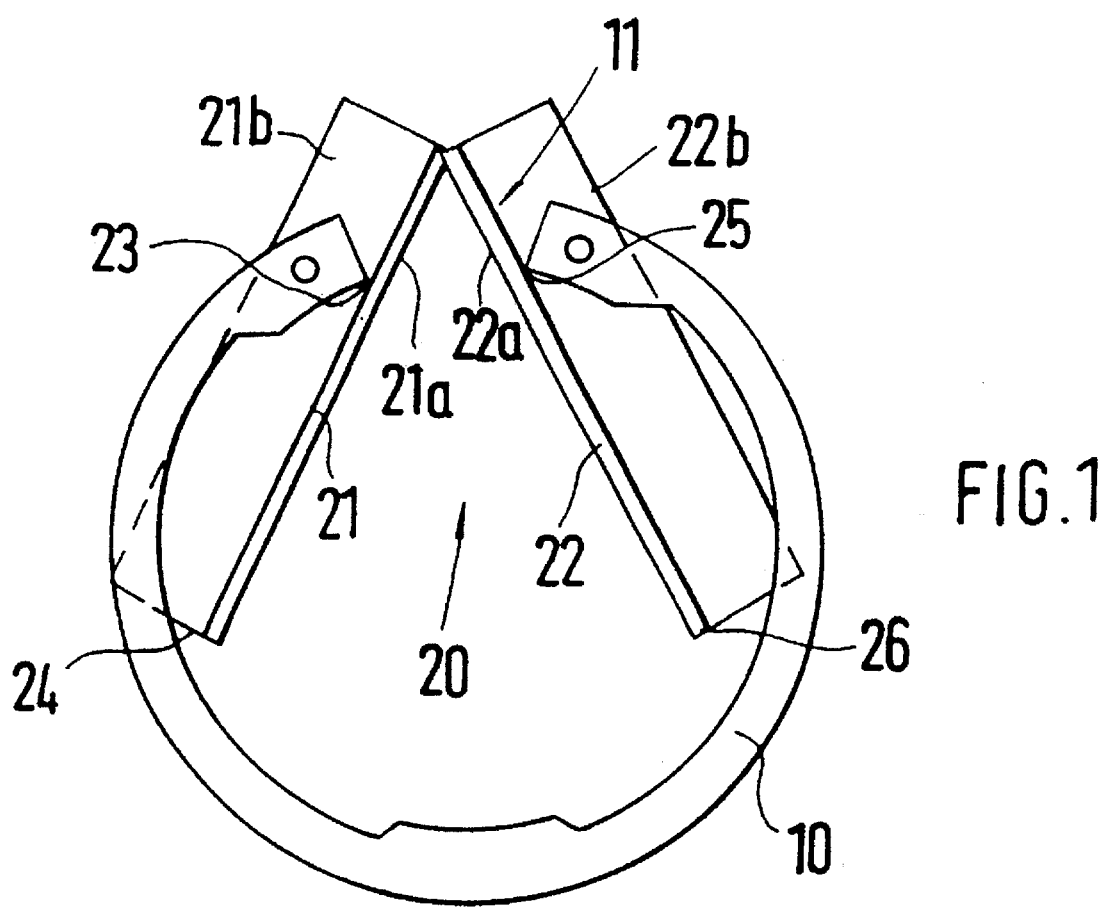
FIG. 1 A partial view of a ring which is stacked on a V-shaped, bent sheet metal part acting as the stack-holding member, FIG. 2 The stack-holding member according to FIG. 1 in perspective view, and FIG. 3 A receiving part of a further processing device for the stack-holding member according to FIG. 2.

The partial view according to FIG. 1 shows a ring (i.e., ring or ring-shaped part, sometimes referred to merely as "part") 10 in the form of an inner securing ring, with a radial opening (or "slot") 11, curved inner edge (nearly complete circle) and opposed ring ends 23 and 25. Stack-holding member 20 is a V-shaped, bent sheet metal part with converging sidewalls 21 and 22. Stack-holding member 20 extends within the inner spaces of stacked aligned rings 10. Converging sidewalls 21 and 22 include angled ring-orientation portion 21a, 22a and distal edges 24 and 26. Opposed ring ends 23 and 25 rest on ring-orientation portion 21a, 22a (sometimes referred to as an orienting element), thereby serving to align radial openings 11, and thus rings 10. Distal edges 24 and 26 contact the curved inner edges of rings 10 and serve to limit rotational movement of rings 10 (in either direction). Effective rotational limitation is provided if distal edges 24 and 26 are located near the diameter of the inner edge which is perpendicular to radial opening 11. Bearing elements 21b and 22b are located at one end of stack-holding member 20. Bearing elements 21b and 22b provide a bearing support for the stack of rings, in contact with the facing surface of the last ring. These bearing elements 21b and 22b are a uniform width and extend across the entire width of the sidewalls 21 and 22 of the stack-holding member 20.

There are many possibilities for designing the stack-holding member 20, but the design also depends on the size of the parts that are to be stacked, and their weight. It is always important that the orienting element be inserted into the radial slots of the parts, adjusted only by means of play, said adjustment being carried out by means of the stack-holding member 20 with its distal edges 24 and 26 arranged in the inner space of the parts, rigidly connected to the orienting element.

Figure 2:
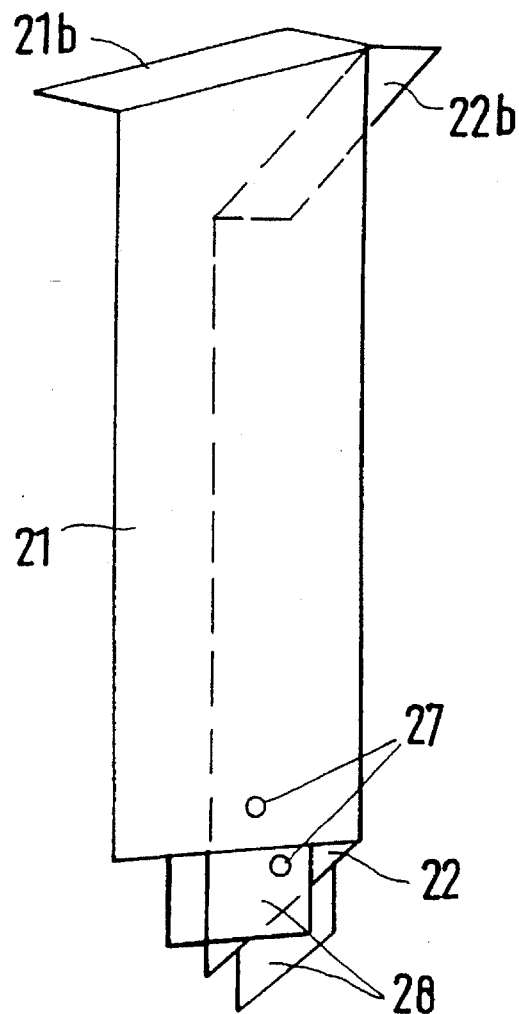

FIG. 2 shows the stack-holding member 20 of FIG. 1 in perspective. The sidewalls 21 and 22 form an acute angle. In this case the angle between the sidewalls 21 and 22 and the width of the sidewalls 21 and 22 are determined by the radius of the inner edges of rings 10 and the width of the radial slot 11. The stack-holding member 20 is produced as a punched-bent part, whereby the bearing elements 21b and 22b are bent. Plug elements 28 may be formed in sidewalls 21 and 22 at the end opposite bearing elements 21b and 22b. Also, the receptacles 27, in the form of bore holes, are produced during punching. These receptacles 27 can also receive a securing bolt which retains the parts 10 on the stack-holding member 20, so that they cannot be lost.

Figure 3:
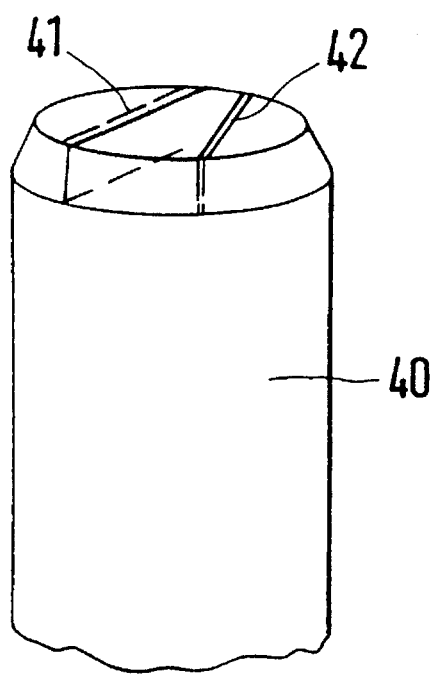

If the plug elements 28 are inserted into the corresponding plug holes 41 and 42 of a further processing device 40 indicated in FIG. 3, and the securing bolt is removed from the receptacles 27, the parts 10 slide from the stack-holding member 20 to another processing unit 40, maintaining their orientation, whereby a different orientation of the parts is prevented, also simplifying the handling of the parts with the stack by the customer. After removing the parts 10 the stack-holding member 20 can be returned to the manufacturer and can be reloaded with parts 10 during production.

A V-shaped, bent sheet metal part can also be used as a packaging element for outer lock rings. In the area of the apex the sides are partially folded on top of themselves, so that a strip shaped orienting element is created that is suitable for the narrow, radial slot. The free ends of the sides create the uninterrupted supporting edges and keep the stacked outer lock rings adjustable on the packaging element to a limited degree, but in such a manner that they cannot be lost.

While the principles of this invention have been described in connection with specific embodiments, it should be understood clearly that these descriptions are made only by way of example and are not intended to limit the scope of the invention.

What is claimed:

1. A stack apparatus with ring-or disk shaped parts provided with inner edges and radial slots which parts are arranged on a stack-holding member introduced into an inner space of the parts defined by said inner edges with the radial slots of the parts aligned in the same direction, wherein the stack-holding member has an orienting element that extends along the length of the stack, said stack-holding member being held in the aligned radial slots by means of rigidly-connected supporting elements, and wherein the supporting elements are supported in the inner space of the parts, and wherein the stack-holding member has bearing elements at a first end on which the stack rests, characterized by the fact that the orienting element and the supporting elements are produced in the form of a bent sheet metal part, wherein the supporting elements are supported, with play, by means of supporting edges symmetrical to the radial slots at the inner edges of the parts, so that the orienting element is held in the radial slots, limited with regard to adjustment.

2. The apparatus of claim 1 wherein the a second end of the stack-holding member includes receptacles for a securing element which secures the parts that are arranged on the stack-holding member such that they cannot be lost.

3. The apparatus of claim 2 wherein the receptacles are formed as bore holes that are aligned with each other to accommodate a locking member that serves as a securing element.

4. The apparatus of claim 1 wherein the second end of the stack-holding member having the securing element is provided with plug elements for attachment to processing equipment.

5. The apparatus of claim 1 wherein the stack-holding member has a pair of sides and is a V-shaped, bent sheet metal piece which provides an uninterrupted strip-like orienting element formed as an apex by folding of the sidewalls.

6. A stack-holding member with aligned stacked rings thereon each of the type having an inner edge defining an inner space and having a radial opening formed between opposed ring ends, wherein:
   the stack-holding member includes a pair of sidewalls converging to form an angled ring-orientation portion for supporting the ring ends, the sidewalls also having distal edges remote from the ring-orientation portion and spaced apart at positions for engagement with the inner edges of the rings; and
   a plurality of rings supported on the stack-holding member with the angled ring-orientation portion extending through the radial openings of such rings;
whereby the rings are supported with play in self-alignment on the stack-holding member.

7. The apparatus of claim 6 wherein the stack-holding member is made of bent sheet metal.

8. The apparatus of claim 6 further including bearing elements at one end of the stack-holding member and each extending from one of the sidewalls, the bearing elements being positioned for contact with an end ring of the plurality of rings.

9. The apparatus of claim 8 wherein the stack-holding member and bearing elements are formed of a single piece of bent sheet metal.

10. The apparatus of claim 6 wherein the sidewalls and the distal edges thereof are symmetrical to one another.

11. The apparatus of claim 10 wherein the distal edges are positioned along the inner edges of the rings in the area of the ring diameter which is perpendicular to the radial opening.

12. The apparatus of claim 6 further including securement means on the sidewalls for preventing removal of rings from the stack-holding member, so that they cannot be lost.

13. The apparatus of claim 12 wherein the securement means includes a pair of aligned openings to receive a locking member extending between and through the sidewalls in position to interfere with ring movement along the stack-holding member.

14. The apparatus of claim 6 further including plug elements extending from one end of the stack-holding member, the plug elements engageable with related equipment.

* * * * *